March 20, 1973  D. E. NEILL  3,721,880

REFRIGERANT COMPRESSOR MOTOR CONTROL

Filed Oct. 12, 1971  2 Sheets-Sheet 1

INVENTOR.
DONALD E. NEILL
BY
ATTORNEY

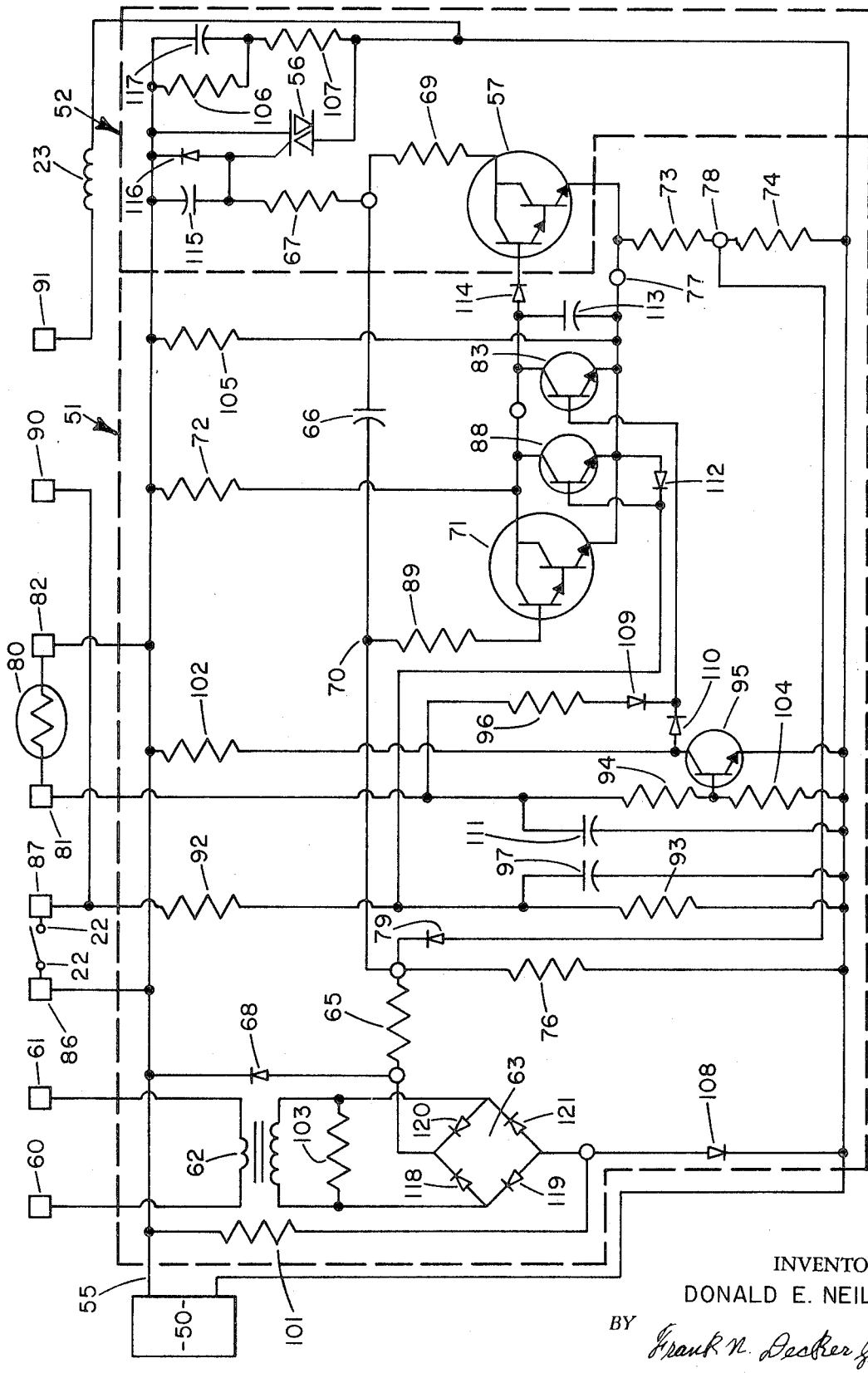

United States Patent Office 3,721,880
Patented Mar. 20, 1973

3,721,880
REFRIGERANT COMPRESSOR MOTOR CONTROL
Donald E. Neill, Liverpool, N.Y., assignor to Carrier
Corporation, Syracuse, N.Y.
Filed Oct. 12, 1971, Ser. No. 188,286
Int. Cl. H02h 7/08
U.S. Cl. 318—471                7 Claims

ABSTRACT OF THE DISCLOSURE

A refrigeration system having an electric motor driven reciprocating compressor is provided with a motor protection and control system. The motor protection and control system includes a motor current sensor for sensing motor current, a temperature sensor for sensing discharge gas temperature from the compressor and a thermostat for sensing room temperature. The signal provided from the current sensor is summed with an opposite polarity reset signal and integrated to provide an input signal to a first trip circuit. When the input to the first trip circuit exceeds a predetermined value, a solid state switch means deenergizes a relay which disconnects the motor from the line current source. The temperature sensor is connected to a second trip circuit which is also capable of de-energizing the relay and the motor in the event of an excessive temperature condition. The thermostat is connected to a third trip circuit in a manner such that opening of the thermostat contacts de-energizes the solid state switch and relay. Closing the thermostat contacts passes a signal through the solid state switch means to energize the relay provided the switch has been reset to the conducting condition. Feedback means are provided responsive to the non-conducting condition of the switch to raise the output of the integration circuit and additional feedback means are provided responsive to the nonconducting condition of the switch to decrease the threshold of the trip circuits. The feedbacks provide a reset level for the system which is lower than the initial trip level and to impose a time delay associated with the first trip circuit on resetting the system after a trip due to opening the thermostat contacts.

CROSS REFERENCE TO RELATED APPLICATION

This applicaion discloses an arrangement for preventing damage to the motor relay contacts due to thermostat chatter which is the subject of applicant's co-pending application Ser. No. 188,275, filed Oct. 12, 1971.

BACKGROUND OF THE INVENTION

It is customary to provide a motor protection system to prevent failures of the electric motor driving the compressor of a refrigeration system. There are numerous modes and causes for failure of a motor in such a system which must be protected against to provide a reliable unit. For example, if an attempt is made to re-energize the motor in a reciprocating refrigeration system shortly after it has stopped, the motor may be unable to start because of the high head pressure difference between the condenser and the evaporator of the system. It is necessary for a period of time to elapse before the motor can be restarted during which the pressures in the refrigeration system have time to equalize through a valve or passage provided for that purpose. The electric motor may also be damaged by excessive current drawn when operating at low line voltages or under excessive or abnormal refrigeration load conditions. Loss of refrigerant charge or failure of the condenser fan can cause the motor to draw excessive current and ultimately damage itself. If the compressor motor can be adequately protected from failure, the trouble will often correct itself or at least can be corrected without damage to the remainder of the system, but if the compressor motor fails, the refrigerant may be decomposed forming acids which can ultimately cause mechanical damage to the entire system.

Commonly, a number of combined internal and external protection ssytems are built into the electric motor and the refrigeration control to take the motor off the line until the cause of the abnormal condition is rectified. For example, temperature switches may be embedded in the motor windings to protect the motor against excessive current such as during a locked rotor condition. A timing device such as an electric motor or a heat operated type may be utilized to provide a time delay for preventing the system from starting up for an interval following de-energization of the motor to allow time for the refrigeration system pressures to equalize. In addition, some type of control means must be provided to cycle the refrigeration compressor in response to the refrigeration unit. This frequently involves some additional type of control arrangement.

While the various control and protection arrangements described may be more or less effective, accumulation of various different types of arrangements in a simple system is excessively expensive and sometimes not entirely reliable. The use of switches embedded in the motor winding for protection is unreliable because the length of time required for the switch to open upon heating or to close upon cooling is subject to wide mechanical variations, as well as total failure of the switch itself. The motor may overheat before the switches open or may remain de-energized for an excessive period of time thereafter. Also, the use of such swicthes requires additional electrical connections be extended through the compressor shell for the switch-relay circuits which is a source of refrigerant leakage and compressor failure, as well as an added expense. Furthermore, in many existing motor protection systems, an excessively long time delay is provided for normally restarting the system because the control system cannot distinguish between the compressor being de-energized due to a normal condition, such as the thermostat contacts opening, and an abnormal condition such as a locked rotor.

Accordingly, it is a principal objective of this invention to provide an improved motor protection and control system which inexpensively and reliably provides all of the needed protection and control functions.

SUMMARY OF THE INVENTION

In accordance with this invention, a control system is provided which includes a motor current sensor for sensing motor current and a reset signal source of opposite polarity to that of the current signal. The two signals are summed and integrated to provide a voltage signal to a trip circuit which in turn controls the compressor motor. If the current associated with the reset signal equals or exceeds the current associated with this motor current signal, as it does under normal operating conditions, the voltage output from the integration circuit remains below the trip level of the trip circuit. In the event that the motor current signal exceeds that of the reset signal, the voltage output from the integration circuit begins to rise toward the trip level. If the magnitude of the current overload is very high, such as under locked rotor conditions, the output from the integration circuit reaches the trip level in a relatively short period of time, because of the large difference between the current and reset signals, but if the motor current overload is relatively small, a much longer time will be required to reach the trip level.

Once the trip circuit has reached trip level, it actuates a switch circuit to a nonconducting condition which de-energizes the relay controlling the motor. When this occurs, time delay is required to restart the motor which is determined by the length of time required to integrate the reset signal alone to a value below the reset level of the trip circuit. The length of time required before the motor can be re-energized is selected so that the motor can never be overheated by the energy supplied to it before a trip occurs and will always have time to cool to a safe value before another attempt at starting can be made.

An additional trip circuit is provided for actuating switch means to its nonconducting condition in response to some other condition of operation such as opening of the thermostat contacts. A feedback circuit raises the output of the integration circuit above the level of the first trip circuit when the switch is nonconducting so that some time delay is required to restart the system in the event the additional trip circuit causes the compressor motor to stop. However, this additional time delay may, if desired, be substantially less than that caused by an over current condition due to the integrator output at the time of the initial trip. Accordingly, the system is enabled to provide a short time delay in the event of a normal trip due to the thermostat opening but provides a much longer time delay in the event of an over current condition before the compressor motor can be re-energized.

BRIEF DESCRIPTION OF THE DRAWINGS

FIG. 2 illustrates a schematic electrical diagram of a motor protection control system in accordance with this invention.

DESCRIPTION OF THE PREFERRED EMBODIMENT

Figure 1:
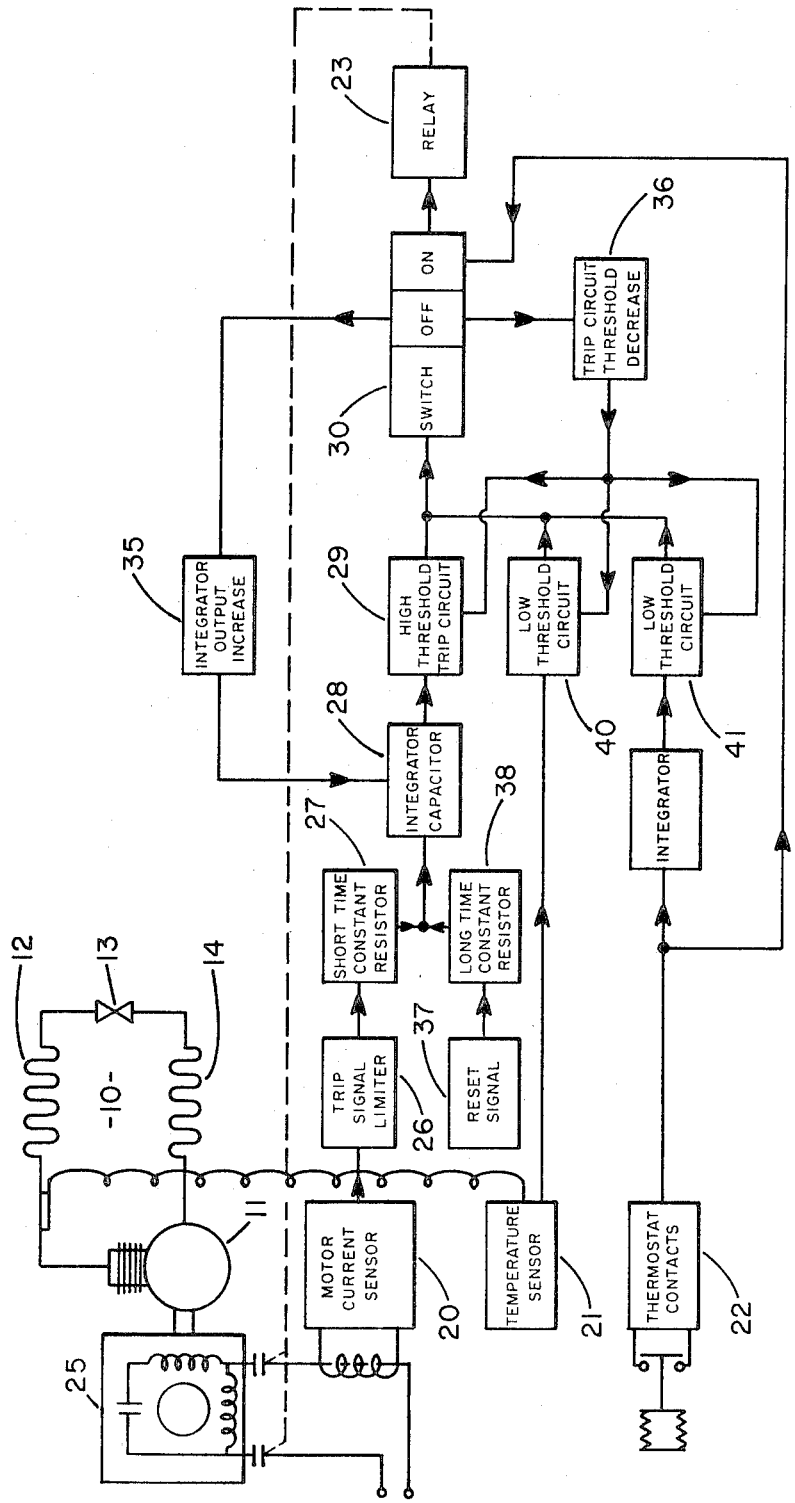
FIG. 1 is a schematic illustration of a reciprocating refrigeration system showing the improved compressor motor control and protection system in block diagram form.

A refrigeration system 10 comprising a reciprocating compressor 11, a condenser 12, an expansion device 13 and an evaporator 14 is driven by an electric motor 25. While for purposes of illustration a simple reciprocating refrigeration system is shown, it will be appreciated that the motor protection and control system of this invention may be employed in various single or multiple phase electric motor driven systems.

The basic operation of the motor protection system will be described with reference to the block diagram in FIG. 1. A motor current sensor 20 which is preferably a current transformer in the common lead of the compressor motor provides a signal output proportional to the motor current and thereby is capable of providing an indication of a motor overload. The signal from the current sensor is passed through trip signal limiter 26 and through a short time constant resistor 27 to an integrator capacitor 28. The trip signal limiter limits the magnitude of the overload signal at some high value, indicating a locked rotor or other serious motor overload condition, so that various motors having somewhat different maximum locked rotor currents will each provide a similar magnitude signal to the integrator and it will be unnecessary to make circuit adjustments to accommodate differing locked rotor currents of various motors.

A second signal of opposite current polarity is also supplied to integrator capacitor 28 from reset signal source 37. The two signals are effectively summed to provide a signal to the integrator capacitor which is a function of the difference between the motor current signal and the reset signal. If the reset signal is equal to or larger than the motor current signal, trip circuit 29 will remain in the set state and not affect the system. If the motor current signal is sufficiently greater than the reset signal, the integrator voltage output will eventually reach the trip threshold level of trip circuit 28 unless the over current condition corrects itself first.

After the signal from integrator 28 has reached the threshold of high threshold trip circuit 29, this circuit will activate switch 30 to the off condition which de-energizes relay 23 and compressor motor 25. The length of time required to de-energize motor 25 under locked rotor conditions will depend on the time constant determined by resistor circuit 27 and may typically be on the order of about 1¼ seconds. If a smaller motor overload, less than the limiting level of limiter 26, is experienced, integrator 28 will not reach the trip level of circuit 29 for a somewhat longer period of time due to the integration function, thereby allowing the motor more time to attempt to start. Since the lower motor current produces less heat, it will be apparent that a greater on time before trip is desirable under relatively light overload conditions.

When switch 30 is actuated to its off state, a feedback signal is fed through circuit 35 to integrator 28 which increases the signal output from the integrator to trip circuit 29. In effect, this provides regenerative feedback to assure that trip circuit 29 remains in the tripped condition. Similarly, a second feedback signal is provided from switch 30 when it is in the off state through circuit 36 to decrease the threshold of trip circuit 29. This signal is also in effect a regenerative feedback which causes high threshold trip circuit 29 to have a lower reset level from that existing prior to the trip.

Switch 30 will remain in the off condition for some preselected period of time which may be typically on the order of five minutes. Since there is no motor current signal, the off period is solely governed by the time required for reset signal 37 passing through long time constant resistor 38 to be integrated by integrator capacitor 28 and achieve an integrator output level corresponding to the reset level established for high threshold trip circuit 29. When this occurs, the high threshold trip circuit is deactivated, thereby switching switch 30 to its on condition. The on condition of switch 30 enables relay 23 to be energized by a current passing through thermostat contacts 22, from a suitable source, provided that the thermostat contacts are closed. When the thermostat contacts open, the current to relay 23 is interrupted, thereby stopping compressor motor 25.

A temperature sensor 21, which may sense various conditions, is preferably attached to the compressed gas discharge line from the compressor and provides a signal to low threshold trip circuit 40 to protect against abnormal conditions in the refrigeration system such as slow loss of refrigerant. When temperature sensor 21 senses and excessive gas discharge temperature, its output causes low threshold trip circuit 40 to activate switch 30 to the off condition, thereby de-energizing motor 25. When switch 30 is activated to the off condition, feedback circuits 35, 36, previously described, raise the output of integrator 28 and decrease the trip threshold sufficiently to trip high threshold trip circuit 29. Consequently, all of the trip circuits have a reset level lower than their trip levels after a trip. Switch 30 will thereafter be activated to the on condition, assuming all sensors are below the reset level, after a time delay determined by resistor 38 and integrator capacitor 28.

Thermostat contacts 22 are connected to a source of low voltage alternating current, such as a transformer (not shown). Contacts 22 open, when cooling is not required, and the AC signal across them is transmitted through integrator 42 to low threshold trip circuit 31 which actuates switch 30 to an off condition after a short time delay. Any actuation to the off condition of switch 30 energizes feedback circuits 35, 36 so that trip circuit 29 is actuated to a tripped condition and so that all trip circuits are actuated to a reset level lower than their former trip level. Consequently, all inputs must be below the reset level before motor 25 can again be energized.

Contacts 22 close when calling for cooling and the low voltage alternating current is enabled to pass through contacts 22 and switch 30 to relay 23 and actuate compressor motor 25.

After a trip occurs due to any of the inputs to the circuit, a reset signal 37 passes through long time constant resistor 38 to integrator 28 so that the circuit will be reset after a predetermined period of time, providing the inputs are below the reset level. However, a trip due to the thermostat contacts opening normally will not require as long a reset time as a trip due to motor over current because of the initially lower integrator output at the time of trip.

Referring particularly to FIG. 2, the actual circuit consists of a power supply 50, a trip circuit 51 and a switch circuit 52. Power supply 50 provides a regulated B+ voltage at terminal 55 and need not be specifically described since any conventional power supply circuit may be utilized.

Switch circuit 52 comprises a triac 56 or other semiconductor switch in series with the contactor coil of relay 23. Switching of triac 56 is controlled by a Darlington transistor pair 57 which is actuated by the current input to its base.

The trip and timing circuit 52 includes the input signal circuits, reset signal circuitry, integration circuitry and the trip and feedback circuits previously discussed.

Terminals 60 and 61 are in series with the common lead of the motor windings. Current transformer 62 provides a voltage to bridge rectifier 63. The output of the rectifier bridge provides a signal through resistor 65 which tends to discharge capacitor 66 which is connected through resistor 67 and the gate circuit of triac 56 to the B+ supply voltage. Capacitor 66 performs the integration function of block 27. A diode 68 limits the voltage output of the rectifier bridge circuit to a voltage slightly above the B+ supply and performs the trip signal limiting function designated by block 26. Resistor 65 in combination with integrator capacitor 66 forms a short time constant circuit which determines the time required to discharge capacitor 66 sufficiently to cause a trip of the switch circuitry.

When the level of signal at input terminal 70, which is connected to the base of Darlington pair 71 through resistor 89, reaches a predetermined positive voltage due to discharge of capacitor 66 through resistor 65, the Darlington pair becomes conductive and causes current to flow through resistor 72, the collector-emitter circuit of pair 71, and resistors 73, 74. The current flow through pair 71 reduces the base to emitter voltage across pair 57 causing it to turn off. As pair 71 turns on and pair 57 turns off, gate current no longer flows into triac 56 from pair 57 through resistors 69, 67, and the triac assumes a nonconducting condition which de-energizes relay 23, opens contacts 75 and de-energizes motor 25.

It will be seen that pair 71 corresponds to the high threshold trip circuit 29 previously described. The preferred circuit uses a high gain trip circuit stage for the motor current trip input, but it will be understood that this high threshold trip circuit could be replaced with a low threshold trip circuit or one using a single input transistor if desired.

When pair 57 is turned off, relatively little current flows through the gate circuit of triac 56 and the voltage drop across resistor 67 is reduced. Since capacitor 66 is connected to one terminal of resistor 67, its positive terminal rises to a more positive voltage which, in effect, momentarily increases output of the integrator at input 70 by raising this point to a higher positive voltage, thereby tending to drive pair 71 into further conduction as diagrammatically illustrated by block 35 of FIG. 1. A second feedback effect is provided when pair 57 is turned off because the reduced current through resistors 73, 74 causes the emitter of pair 71 to drop to a more negative voltage, thereby reducing the voltage threshold required to trigger pair 71 to a conducting state. By dropping the emitter voltage of pair 71, it will be apparent that the signal level required to turn pair 71 off is lower than the level required to initially turn it on, or in other words, a reset level has been provided which is lower than the trip level as diagrammatically illustrated by block 36.

After switch circuit 52 has been actuated to a nonconducting state, capacitor 66 will slowly charge through resistor 76 which corresponds to long time constant block 38. Eventually, input terminal 70 of capacitor 66 will charge to a more negative voltage than that of the reset potential established for pair 71. As the base of pair 71 becomes more negative, this pair becomes nonconducting, and the voltage on the collector of pair 71 and the base of pair 57 rises so that pair 57 becomes conducting again. At the same time, the larger emitter current flow through pair 57 and resistors 73, 74 causes the voltage at conductor 77 to be more positive, thereby driving pair 71 off and pair 57 further into conduction. At the same time, pair 71 is driven further into a nonconducting state because the voltage drop across resistor 67 increases due to the current flow, through the gate of triac 56, which has the effect of making the voltage on capacitor 66 and at input terminal 70 more negative. As the voltage at terminal 70 becomes more negative and the voltage at point 78 becomes more positive, diode 79 becomes forward biased and capacitor 66 discharges rapidly therethrough. The discharge of capacitor 66 through diode 79 during reset assures that a proper reset time delay will be required after a thermostat related trip.

Thermistor 80 is connected across contacts 81, 82 to provide a signal input to transistor 83 which functions as low threshold trip circuit block 40. Similarly, thermostat contacts 86, 87 are connected to provide a signal to transistor 88 which functions as low threshold trip circuit block 41 previously described.

If the temperature of thermistor 80 is low (high resistance) and thermostat contacts 81, 82 are closed, neither transistor 83 or 88 will be conducting. Under these conditions, assuming low or no motor current, relay 23 can be energized by a suitable low voltage current source connected to the thermostat terminals. This current flows from terminal 91 through the relay solenoid 23, triac 56 and thermostat contacts 22, to terminal 90. If the temperature of thermistor 80 is sufficiently high or if the thermostat contacts are open, a positive voltage will appear on the base of transistors 83 or 88 respectively, which will cause switch 56 to become nonconducting thereby increasing the integrator output reducing the trip threshold to the reset value as previously described and tripping pair 71. It will be noted that it is necessary for each of the sensor inputs to be below the reset level before the switch circuit can thereafter be activated to an on condition. It is also necessary for a minimum time delay determined by the charging rate of capacitor 66 through resistor 76 to expire before the compressor motor can be again energized.

While a relatively long time delay of about five minutes must expire in the event that an over current condition has tripped pair 71, only a shorter period of time need expire in the event that the circuit is tripped by either transistors 83 or 88. This is because a trip due to an over current condition will discharge the voltage across capacitor 66 to an extent providing a high positive voltage at input 70 which is above the reset level and the capacitor must charge from resistor 76 through this large voltage increment before the base of pair 71 is driven sufficiently negative to reach the reset level. However, in the event the circuit was tripped due to an over-temperature condition or thermostat contacts opening, capacitor 66 will most likely be at a higher potential at the time of trip and need charge only through a lesser voltage difference before pair 71 reaches the reset level. Capacitor 66 determines both the on time for a current related trip and off periods for the entire circuit in the event of a trip.

Typical component values are given in the following table:

SEMICONDUCTORS

| Ref. No.: | Part No. |
|---|---|
| 108 | IN4148 |
| 118 | IN4148 |
| 119 | IN4148 |
| 120 | IN4148 |
| 121 | IN4148 |
| 79 | IN4148 |
| 110 | IN4148 |
| 109 | IN4148 |
| 112 | IN4148 |
| 114 | IN4148 |
| 116 | IN270 |
| 68 | IN4148 |
| 71 | 2N5306 |
| 88 | 2N5172 |
| 83 | SPS2366 |
| 57 | SPS6613 |
| 95 | 2N5088 |
| Triac 56 | RCA-61104 |

RESISTORS

| Ref. No.: | Value |
|---|---|
| 101 | 3.3K |
| 103 | ohm± 665 |
| 65 | 6.2K |
| 76 | 1.8M |
| 92 | 120K |
| 93 | 43K |
| 94 | 1.2K |
| 104 | 820K |
| 102 | 330K |
| 96 | 15K |
| 89 | 4.7M |
| 72 | 33K |
| 73 | 72 |
| 74 | 118 |
| 105 | 442 |
| 69 | ohm 76.8 |
| 67 | 110 |
| 106 | 68K |
| 107 | 100 |

CAPACITORS

| Ref. No.: | Value |
|---|---|
| 97 | μf .01 |
| 111 | μf .01 |
| 115 | μf .1 |
| 117 | μf .05 |
| 66 | μf 220 |
| 113 | μf 1.0 |

The operation of the motor protection system will be apparent from the foregoing description. Normally, the thermostat contacts closing will assure that the compressor motor will be energized provided triac 56 is conducting. In general, a high locked rotor motor condition will drive the voltage input to the high threshold trip circuit 29 at the maximum rate determined by the limiter output voltage and the time constant of the integrator circuit which discharges capacitor 66. This will result in a relatively fast trip on the order of 1¼ seconds and will be relatively independent of the maximum current magnitude so that motors having differing maximum locked rotor currents will all trip after about the same interval of time. Thereafter, the integrator will receive reset signal current, unreduced by any motor current signal, through the long time constant circuit which includes resistor 76, and eventually will provide a signal voltage output sufficient to reset the circuit and turn the motor back on. Typically, reset will require about five minutes. However, in the event that the circuit is tripped on either the temperature sensor or thermostat contacts, the integrator will normally require a relatively shorter period of time to reach the trip level due to its pre-existing lower (less positive) output state. Typically a trip on the thermostat contacts will require in excess of about 2½ minutes before reset occurs.

Under normal motor operating conditions, the rate of discharge of capacitor 66 through the short time constant circuit resistor 65 will be balanced by the rate of charging of capacitor 66 through long time constant resistor 76 so that input 70 will remain more negative than the established trip level. However, if a light motor current overload occurs, the discharge rate of capacitor 66 will increase due to the higher output from bridge circuit 63. If the motor current overload does not correct itself, eventually input 70 will reach the trip level in a period of time greater than the locked rotor trip time. Capacitor 66 integrates a signal which is the result of the difference between the discharging motor current signal passing through resistor 65 and the opposite polarity passing reset current signal passing through resistor 76. If this difference results in a sufficient discharge of capacitor 66, input 70 will reach the trip level and de-energize the motor. It will be seen that the summing of the motor current signal with the opposite current polarity reset signal causes the voltage at terminal 70 to rise or fall to a steady state level such that current through resistor 65 balances the current through resistor 76 after capacitor 66 has charged to the required voltage. Thus the two signals are effectively summed and integrated to provide a signal to pair 71. This summing and integration function could be performed indirectly through transistor stages, if desired.

In the event that thermostat contacts chatter after closing, momentary opening of the contacts will trip the circuit and provide an off time which protects the relay contacts from excessive burning or welding.

While a preferred embodiment of this invention has been described for purposes of illustration, it will be appreciated that this invention may be otherwise embodied within the scope of the following claims.

I claim:

1. A control system for governing operation of the compressor motor of a refrigeration system; said control system comprising:
   (A) switch means having a conducting and a nonconducting condition for connecting and disconnecting said compressor motor with a source of electric current;
   (B) motor current sensing means connected to provide a motor current signal responsive to the magnitude of current drawn by the compressor motor over at least a portion of the operating range of the motor;
   (C) reset signal means connected to provide a reset signal of opposite polarity to that of the motor current signal to said control system to enable said motor to be energized by the control system;
   (D) a first trip circuit having a predetermined trip level for rendering said switch means nonconducting in response to an input signal of a predetermined magnitude being supplied thereto;
   (E) integration circuit means for integrating the sum of said motor current signal and said reset signal, and means to provide the integrated output signal from the integration circuit means to the input of said first trip circuit, said integrated output signal reaching the trip magnitude in a relatively short period of time upon the occurrence of a relatively great motor current overload condition and reaching the trip magnitude in a longer period of time upon the occurrence of a relatively light motor current overload condition, the same integration circuit providing and controlling both the on time and the reset time of the control system depending on the relative magnitude of the motor current and reset signals supplied to the integration circuit;

(F) a second trip circuit for rendering said switch means nonconducting irrespective of the output signal from said integration circuit, in response to another condition of operation of the refrigeration system.

2. A control system as defined in claim 1 including feedback means responsive to the nonconducting condition of said switch means for lowering the trip level of both of said trip circuits whenever one of the circuits is tripped so as to provide a reset level below the trip level of the trip circuits when the switch means is in the conducting condition.

3. A control system as defined in claim 1 including feedback means responsive to the nonconducting condition of said switch means for lowering the trip level of said first trip circuit and for raising the output level of said integration circuit so that tripping of said second trip circuit also trips said first trip circuit to provide a time delay before the compressor motor can be restarted after said second trip circuit is tripped, the time delay required to reset the control system due to a trip by said second trip circuit being normally less than the time delay required to reset the control system due to a trip by said first trip circuit because of the normally lower initial integrator output signal occurring at the time of a trip by the second trip circuit.

4. A control system as defined in claim 1 wherein said integration circuit comprises a capacitor; said motor current signal is connected with capacitor through relatively small resistor to form a relatively short time constant circuit; and said reset signal is connected with said capacitor through a relatively large resistor to form a relatively long time constant circuit, whereby when the motor current signal magnitude is greater than the reset signal magnitude, the integration circuit output reaches the trip level of the first trip circuit in a relatively short period of time, and when the reset signal magnitude is greater than the motor current signal magnitude, the integration circuit output reaches the reset level in a relatively long period of time.

5. A control system as defined in claim 1 including a third trip circuit for actuating said switch means to the nonconducting condition in response to an excessive temperature signal sensed in a portion of the refrigeration system irrespective of the motor current signal input to said integration circuit; and feedback means associated with said switch means for lowering the trip level of said first trip circuit and for raising the integrator output, thereby tripping said first trip circuit in response to tripping of either said second or said third trip circuit, whereby a time delay is provided before said system is reset and said compressor motor can be re-energized.

6. A motor protection control system comprising:
(A) switch means for connecting and disconnecting an electric motor with a source of electric current;
(B) motor current sensing means connected to provide a motor current signal to said control system responsive to the magnitude of current drawn by the motor over at least a portion of the operating range thereof;
(C) reset signal means connected to provide a reset signal of opposite polarity to that of the motor current signal to said control system to enable the system to energize said motor;
(D) a first trip circuit having a trip level for rendering said switch means nonconducting in response to an input signal of a predetermined magnitude being supplied thereto;
(E) integration circuit means for integrating the sum of motor current signal and reset signal, and means to provide the integrated output signal from the integration circuit means to the input of said trip circuit, said integrated output signal reaching the trip magnitude in a relatively short period of time upon the occurrence of a relatively great motor current overload condition and reaching the trip magnitude in a longer period of time upon the occurrence of a relatively light motor current overload condition, the same integration circuit providing both the on time and the reset time of the control system depending on the difference in magnitude between the motor current and reset signals supplied to the integration circuit;
(F) a second trip circuit for rendering said switch means nonconducting in response to a predetermined signal input irrespective of the magnitude of the output; and
(G) feedback means associated with said switch means for tripping said first trip circuit upon tripping of the second trip circuit so that a period of time determined by the integration circuit must elapse before the control system is reset to allow re-energizing of said motor.

7. A motor protection and control system as defined in claim 6 wherein said reset signal means is connected with the integration circuit in a manner to form a relatively long time constant circuit so that a substantially greater period of time is required for the motor to be restarted after a high current overload than the length of time required to trip the motor due to the high current overload.

References Cited

UNITED STATES PATENTS

| | | | |
|---|---|---|---|
| 3,127,754 | 4/1964 | Mobarry | 62—158 |
| 3,625,020 | 12/1971 | Kimpel et al. | 62—158 |
| 3,660,718 | 5/1972 | Pinckaers | 317—13 B |
| 3,559,420 | 2/1971 | Lipscomb | 318—472 X |

BENJAMIN DOBECK, Primary Examiner

U.S. Cl. X.R.

317—13 B; 62—158